US012759116B2

(12) United States Patent
Harvey et al.

(10) Patent No.: US 12,759,116 B2
(45) Date of Patent: Oct. 13, 2026

(54) WRENCH

(71) Applicant: Milwaukee Electric Tool Corporation, Brookfield, WI (US)

(72) Inventors: Kyle Harvey, Wauwatosa, WI (US); Timothy Janda, Kenosha, WI (US); Eric Mackey, Milwaukee, WI (US); Steven W. Hyma, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 968 days.

(21) Appl. No.: 14/226,221

(22) Filed: Mar. 26, 2014

(65) Prior Publication Data

US 2014/0290446 A1 Oct. 2, 2014

Related U.S. Application Data

(60) Provisional application No. 61/805,422, filed on Mar. 26, 2013.

(51) Int. Cl.

*B25B 13/50* (2006.01)
*B25B 13/12* (2006.01)

(Continued)

(52) U.S. Cl.

CPC .......... *B25B 13/5058* (2013.01); *B25B 13/12* (2013.01); *B25G 1/043* (2013.01)

(58) Field of Classification Search

CPC . B25B 13/5025; B25B 13/5058; B25B 13/12; B25B 13/16; B25G 1/005; B25G 1/043

(Continued)

(56) References Cited

U.S. PATENT DOCUMENTS

| | | | |
|---|---|---|---|
| 59,852 | A | 11/1866 | McLaren |
| 179,276 | A | 6/1876 | Crosby |

(Continued)

FOREIGN PATENT DOCUMENTS

| | | |
|---|---|---|
| CN | 2726826 | 9/2005 |
| CN | 201102213 | 8/2008 |

(Continued)

OTHER PUBLICATIONS

Australian Examination Report No. 1 for Application No. 2014241257 dated Jan. 12, 2017 (6 pages).

(Continued)

*Primary Examiner* — Bryan R Muller
(74) *Attorney, Agent, or Firm* — Reinhart Boerner Van Deuren s.c.

(57) ABSTRACT

A pipe wrench that includes a head including an aperture and a first jaw including a plurality of teeth that define a contact region. The wrench further includes a second jaw that extends through the aperture of the head and includes a threaded portion and a plurality of teeth that define a contact region. A thumb wheel moves the contact region of the second jaw toward and away from the contact region of the first jaw. An auxiliary drive is spaced from the contact regions of the first and second jaws, and the auxiliary drive includes a first auxiliary drive portion located on the first jaw and a second auxiliary drive portion located on the second jaw such that rotation of the thumb wheel moves the second auxiliary drive portion toward and away from the first auxiliary drive portion.

17 Claims, 13 Drawing Sheets

(51) Int. Cl.
*B25B 13/16* (2006.01)
*B25G 1/04* (2006.01)

(58) Field of Classification Search
USPC .................................................... 81/129–149
See application file for complete search history.

(56) References Cited

U.S. PATENT DOCUMENTS 461,769 A 10/1891 Patton
467,151 A 1/1892 Carpenter
483,785 A * 10/1892 Hilts ....................... B25B 13/52 81/69
592,031 A 10/1897 Waitt
869,097 A 10/1907 Mandl
954,335 A 4/1910 Page
966,300 A 8/1910 Bennett
992,127 A 5/1911 Hachmann
998,271 A 7/1911 Barabe
1,000,724 A 8/1911 Duffey
1,032,035 A 7/1912 Beck
1,074,936 A 10/1913 Evans
1,129,771 A * 2/1915 Wolfe ................. B25B 13/5058 81/101
1,163,233 A * 12/1915 Haban ................. B25B 13/5058 7/142
1,204,999 A 11/1916 McCord
1,209,002 A * 12/1916 Martin ................ B25B 13/5058 81/174
1,288,248 A * 12/1918 Snowdon ............ B25B 13/5058 81/103
1,334,392 A 3/1920 Lumpkin
1,345,983 A 7/1920 Bell
1,353,246 A 9/1920 Kiefer
1,356,577 A 10/1920 Wiertz
1,362,845 A 12/1920 Carr
1,380,052 A * 5/1921 Fowble ................... B25B 13/12 81/167
1,395,952 A 11/1921 Fraro
1,449,386 A 3/1923 Evans et al.
1,492,478 A 4/1924 Markovich
1,504,870 A 8/1924 Coughlin
1,542,123 A * 6/1925 Eifel ....................... B25B 13/22 81/131
1,563,242 A 11/1925 Tweit
1,565,338 A 12/1925 Thewes
1,589,736 A * 6/1926 Bell .................... B25B 13/5058 81/105
1,589,763 A 6/1926 Ratcliff
1,599,399 A 9/1926 Bjornson et al.
1,652,355 A 12/1927 Hammer
1,662,002 A 3/1928 Dowd
1,697,764 A 1/1929 Heinz
1,727,623 A 9/1929 Thewes
1,862,002 A * 6/1932 Brungardt ............... B25B 13/16 81/101
2,051,755 A 8/1936 Thewes
2,063,318 A 12/1936 Larson
2,076,830 A 4/1937 Thewes
2,116,743 A 5/1938 Henderson
2,192,702 A * 3/1940 Wright ................ B25B 13/5058 81/101
2,282,148 A * 5/1942 Mandl .................... B25G 1/043 74/544
2,302,633 A * 11/1942 Ingwer ................ B25B 13/5058 81/101
2,483,713 A * 10/1949 Seaver ................ B25B 13/5058 81/91.1
2,502,407 A 3/1950 Gordon
2,517,729 A * 8/1950 Smith ..................... B25B 13/16 81/100
2,528,814 A * 11/1950 Boyer ....................... B25B 7/02 81/183
2,629,279 A 2/1953 Smith-Peterson et al.
2,650,512 A 9/1953 Johnson et al.
2,691,317 A 10/1954 Olson
2,696,133 A 12/1954 Burgess
2,700,911 A 2/1955 Dyczynski
2,748,641 A 6/1956 Calello
2,760,395 A 8/1956 Pierre
2,766,650 A * 10/1956 Capra ....................... B25B 7/02 279/93
2,813,443 A 11/1957 St. Pierre
2,825,254 A * 3/1958 Peltcher ................ B25B 13/481 81/165
2,959,996 A 11/1960 Wheeler
3,046,821 A 7/1962 Legris
3,188,894 A 6/1965 Matsuoka
3,280,667 A 10/1966 Woodling
3,631,549 A 1/1972 Stoneburg
3,657,949 A 4/1972 Myers
3,802,466 A 4/1974 Panella
3,956,949 A 5/1976 Romano
3,996,820 A 12/1976 Tuell
4,541,313 A 9/1985 Wise
4,572,037 A 2/1986 Jeng-Shyong
4,580,468 A 4/1986 Cox
4,597,315 A 7/1986 Chen
4,729,281 A * 3/1988 Holloway, Jr. ........ B25G 1/043 81/177.85
4,794,829 A 1/1989 Mesenhoeller
4,831,903 A * 5/1989 Dausey ................... B25B 13/16 81/165
4,903,555 A 2/1990 Howard
5,152,198 A 10/1992 Schmitz, Jr.
5,251,518 A 10/1993 Woo
5,331,868 A 7/1994 Elmore
5,392,673 A * 2/1995 Scott ...................... B25G 1/043 81/177.2
5,517,884 A 5/1996 Sanders
5,542,319 A 8/1996 Wei
5,823,076 A 10/1998 Binkowski
5,832,793 A 11/1998 Collins
5,862,722 A 1/1999 Cislo
5,873,148 A * 2/1999 Arnold ................... B25G 1/102 81/177.1
5,927,159 A 7/1999 Yokoyama et al.
5,957,008 A 9/1999 Long
5,960,683 A 10/1999 Malkin et al.
6,026,714 A 2/2000 Chang
6,089,129 A 7/2000 Huang
6,098,505 A 8/2000 Chang
6,131,491 A 10/2000 Hirse
D435,410 S 12/2000 Lin
6,167,784 B1 1/2001 Lin
6,223,632 B1 5/2001 Johnson
6,257,102 B1 7/2001 Perry
6,298,754 B1 10/2001 Brown
6,305,251 B1 10/2001 Pasbrig
6,311,586 B1 11/2001 Hirse
6,334,377 B1 1/2002 Wu
6,336,381 B2 1/2002 McDonnell
6,349,621 B1 2/2002 Khachatoorain
6,378,400 B1 4/2002 Bogli
6,393,951 B1 5/2002 Jansson et al.
6,431,033 B1 8/2002 Cheng
6,477,921 B1 11/2002 Picone
D474,380 S 5/2003 Chartier et al.
6,568,283 B2 5/2003 Fanguy
D483,238 S 12/2003 Hsich
6,742,419 B2 * 6/2004 Chartier ................ B25B 13/505 81/111
D494,030 S 8/2004 Burry
6,810,775 B2 11/2004 Yang
6,931,969 B2 8/2005 Hsien
6,938,525 B2 9/2005 Poole et al.
6,961,973 B1 11/2005 Smith
6,966,242 B2 11/2005 Picone
6,971,288 B2 12/2005 Wei
7,040,199 B2 5/2006 Gregory
7,044,030 B2 5/2006 Chartier et al.
7,059,221 B2 6/2006 Simon
7,096,764 B2 8/2006 Dong

(56) References Cited

U.S. PATENT DOCUMENTS

| | | | | |
|---|---|---|---|---|
| 7,114,824 | B2 | 10/2006 | Picone | |
| 7,131,355 | B2 | 11/2006 | Williams | |
| D546,148 | S | 7/2007 | Becker | |
| D564,848 | S | 3/2008 | Salazar et al. | |
| D571,172 | S | 6/2008 | Yu | |
| 7,472,630 | B1 | 1/2009 | Velluzzi | |
| 7,546,784 | B1 | 6/2009 | Yu | |
| 7,578,219 | B2 | 8/2009 | Wu | |
| 7,882,768 | B2 | 2/2011 | Urquizu Osa | |
| D657,213 | S | 4/2012 | Pond et al. | |
| 8,176,816 | B2 | 5/2012 | Simon | |
| D676,727 | S | 2/2013 | Martin et al. | |
| 8,549,961 | B2 | 10/2013 | Huang | |
| 9,610,676 | B2 | 4/2017 | Kundracik et al. | |
| 2001/0035076 | A1 | 11/2001 | Gilbert | |
| 2003/0015068 | A1 | 1/2003 | Pool et al. | |
| 2003/0110905 | A1 | 6/2003 | Lacey | |
| 2003/0183048 | A1 | 10/2003 | Olsen | |
| 2004/0012915 | A1 | 1/2004 | Hsu | |
| 2004/0129115 | A1 | 7/2004 | Gregory | |
| 2004/0237731 | A1 | 12/2004 | Ha | |
| 2005/0204873 | A1* | 9/2005 | Ana | B25G 1/043 81/177.2 |
| 2005/0243553 | A1 | 11/2005 | Picone | |
| 2006/0053982 | A1 | 3/2006 | Mo | |
| 2006/0196319 | A1 | 9/2006 | Hung et al. | |
| 2007/0074608 | A1 | 4/2007 | Mo | |
| 2007/0125205 | A1 | 6/2007 | Beckwith et al. | |
| 2007/0245861 | A1 | 10/2007 | Shields | |
| 2008/0276762 | A1 | 11/2008 | Dein | |
| 2009/0193940 | A1 | 8/2009 | Kuo | |
| 2009/0217790 | A1 | 9/2009 | Harter | |
| 2010/0050825 | A1 | 3/2010 | May | |
| 2010/0083798 | A1 | 4/2010 | Tai | |
| 2010/0122612 | A1 | 5/2010 | Kovach et al. | |
| 2010/0242686 | A1 | 9/2010 | Gower | |
| 2011/0232427 | A1 | 9/2011 | Streater et al. | |
| 2013/0180367 | A1* | 7/2013 | Wang | B25B 13/14 81/170 |
| 2013/0327186 | A1* | 12/2013 | Harvey | B25B 13/14 81/126 |
| 2014/0007744 | A1 | 1/2014 | Watson et al. | |
| 2014/0069238 | A1 | 3/2014 | Chang | |
| 2014/0083260 | A1 | 3/2014 | Kundracik et al. | |
| 2014/0116206 | A1 | 5/2014 | Chartier et al. | |
| 2015/0000476 | A1* | 1/2015 | Li | B25B 13/005 81/124.7 |

FOREIGN PATENT DOCUMENTS

| | | |
|---|---|---|
| CN | 201102213 Y | 8/2008 |
| CN | 101268245 | 9/2008 |
| CN | 201511326 | 6/2010 |
| CN | 204431137 | 7/2015 |
| DE | 202006018047 | 3/2007 |
| GB | 711231 | 6/1954 |
| GB | 753198 | 7/1956 |
| JP | 06021856 | 3/1994 |
| TW | 234970 | 11/1994 |
| TW | 309827 | 7/1997 |
| TW | 451783 | 8/2001 |
| TW | 493505 | 7/2002 |
| TW | 501520 | 9/2002 |
| TW | M311538 | 5/2007 |
| TW | M344224 | 11/2008 |
| TW | M440851 | 11/2012 |
| TW | M465252 | 11/2013 |
| TW | M471338 | 2/2014 |
| WO | WO9740964 | 11/1997 |
| WO | WO 98/21010 | 5/1998 |

OTHER PUBLICATIONS

Extended European Search Report for Application No. 14775769.4 dated Feb. 24, 2017 (10 pages).

International Search Report and Written Opinion for Application No. PCT/US2014/031880 dated Aug. 29, 2014 (16 pages).

International Search Report and Written Opinion for Application No. PCT/US2015/046847 dated Dec. 12, 2015 (5 pages).

Australian Examination Report No. 2 for Application No. 2014241257 dated Mar. 24, 2017 (6 pages).

Australian Examination Report No. 3 for Application No. 2014241257 dated Oct. 9, 2017 (7 pages).

Internet publication; "https://www.lowes.com/search?searchTerm=pipe+wrench", results for different pipe wrenches available at known national retailer (Year: 2018).

Internet Publication; "https://smile.amazon.com/Grizzly-H 6271-Steelex-1 0-Inch-14-I nch/dp/B0007D2YU4/ref=sr_1_12?keywords=pipe+wrench+set&qid=1562104228&s=gateway&sr=8-12"; Grizzly Pipe Wrench set (Year: 2016).

Internet Publication; "https://www.amazon.com/Titan-Tools-21304-4-Piece-Wrench/dp/BOOTU3U N PK"; Titan Tools Pipe Wrench Set (Year: 2015).

* cited by examiner

WRENCH

CROSS-REFERENCE TO RELATED APPLICATIONS

This application claims priority to U.S. Provisional Patent Application No. 61/805,422, filed Mar. 26, 2013, the entire contents of which are hereby incorporated by reference herein.

BACKGROUND

The present invention relates to wrenches, and more particularly to pipe wrenches.

Pipe wrenches are typically used to rotate, tighten, or otherwise manipulate pipes, valves, fittings, and other plumbing components. Some types of pipe wrenches include a fixed jaw and a hook jaw movable with respect to the fixed jaw to adjust the spacing between the jaws. Because pipe wrenches are often used to apply torque to round work pieces, the jaws typically include teeth for improved grip.

SUMMARY

In one embodiment, the invention provides a pipe wrench that includes a head including an aperture and a first jaw that is fixed to the head. The first jaw includes a plurality of teeth that define a contact region. The wrench further includes a second jaw that extends through the aperture of the head, the second jaw including a threaded portion and a plurality of teeth that define a contact region. A thumb wheel that includes threads is engaged with the threaded portion of the second jaw such that rotation of the thumb wheel relative to the head moves the contact region of the second jaw toward and away from the contact region of the first jaw. An auxiliary drive is spaced from the contact regions of the first and second jaws, and the auxiliary drive includes a first auxiliary drive portion located on the first jaw and a second auxiliary drive portion located on the second jaw such that rotation of the thumb wheel moves the second auxiliary drive portion toward and away from the first auxiliary drive portion.

In another embodiment, the invention provides a pipe wrench including a head including an aperture and a first jaw that is fixed to the head. The first jaw includes a plurality of teeth that define a contact region. The wrench further includes a second jaw that extends through the aperture of the head and the second jaw includes a threaded portion and a plurality of teeth that define a contact region. A thumb wheel that includes threads is engaged with the threaded portion of the second jaw such that rotation of the thumb wheel relative to the head moves the contact region of the second jaw toward and away from the contact region of the first jaw. The wrench further includes a bore and a handle at least partially received in the bore and removably coupled to the head.

In another embodiment, the invention provides a pipe wrench including a head including an aperture and a first jaw that is fixed to the head. The first jaw includes a plurality of teeth that define a contact region. The wrench further includes a second jaw that extends through the aperture of the head and the second jaw includes a threaded portion and a plurality of teeth that define a contact region. A thumb wheel that includes threads is engaged with the threaded portion of the second jaw such that rotation of the thumb wheel relative to the head moves the contact region of the second jaw toward and away from the contact region of the first jaw. The wrench further includes a handle having a proximal end portion and a distal end portion. The distal end portion is adjacent the head and the proximal end portion is opposite the distal end portion. The proximal end portion includes a bore configured to receive an extension handle.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
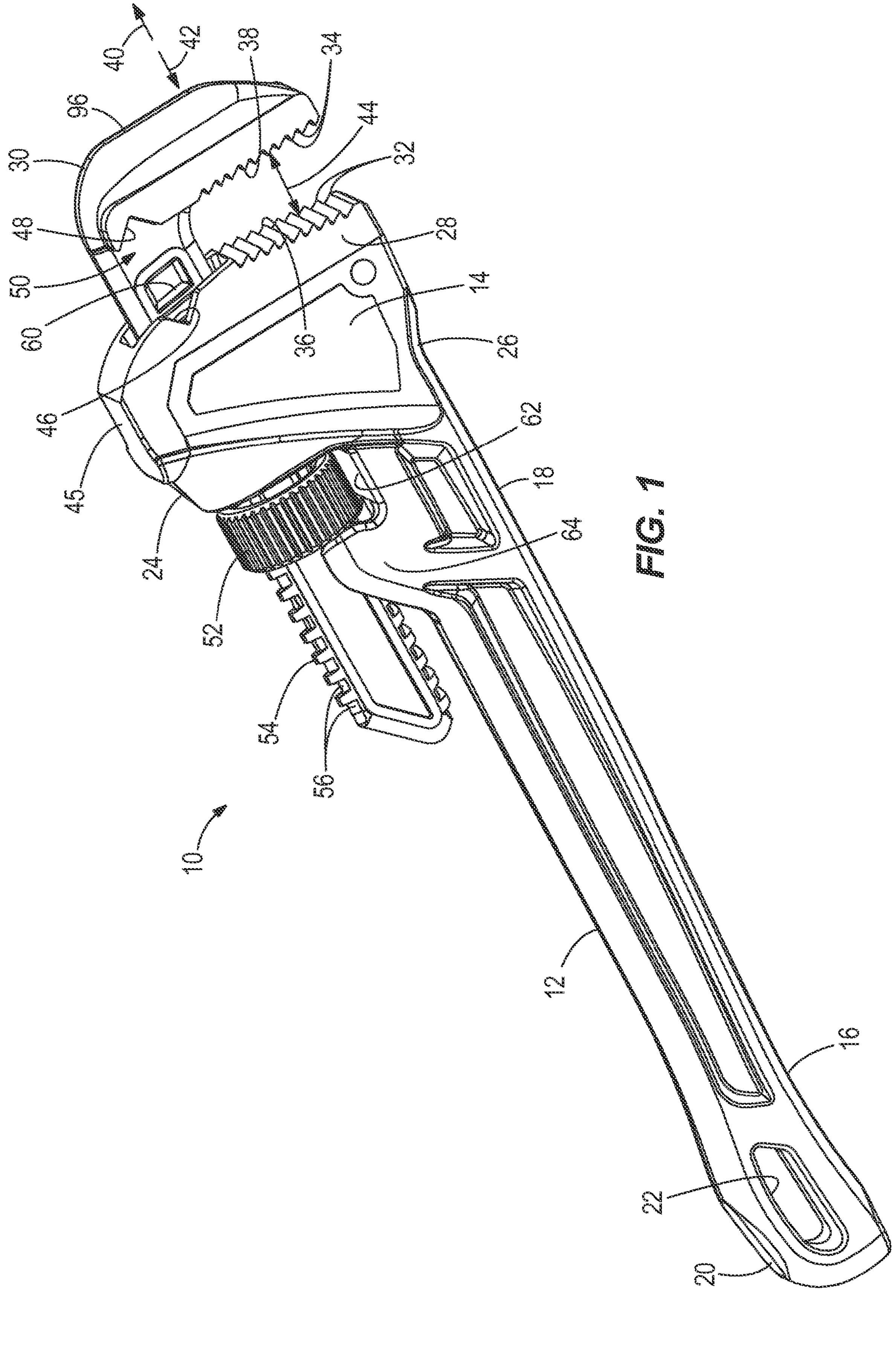
FIG. 1 is a perspective view of a wrench according to an embodiment of the invention.

FIG. 1 illustrates a wrench 10 according to an embodiment of the invention. The wrench 10 includes a handle 12 and a head 14. The handle 12 is elongated and has a proximal end portion 16 and a distal end portion 18 adjacent the head 14. In the illustrated embodiment, the handle 12 has a length of about 14 inches. In other embodiments, the handle 12 can have a length of about 18 inches to provide additional reach and to facilitate use of the wrench 10 in overhead spaces. The handle 12 includes a generally planar surface 20 located at the proximal end portion 16 for use as a hammering surface or for supporting the wrench 10 on a flat surface. The handle 12 also includes an aperture 22 extending through the handle 12 at the proximal end portion 16. The aperture 22 provides a location for hanging the wrench 10 (e.g., for storage purposes). The head 14 includes chamfered regions 24 and 26 that can provide a choked-up gripping area for a user of the wrench 10.

Figure 2:
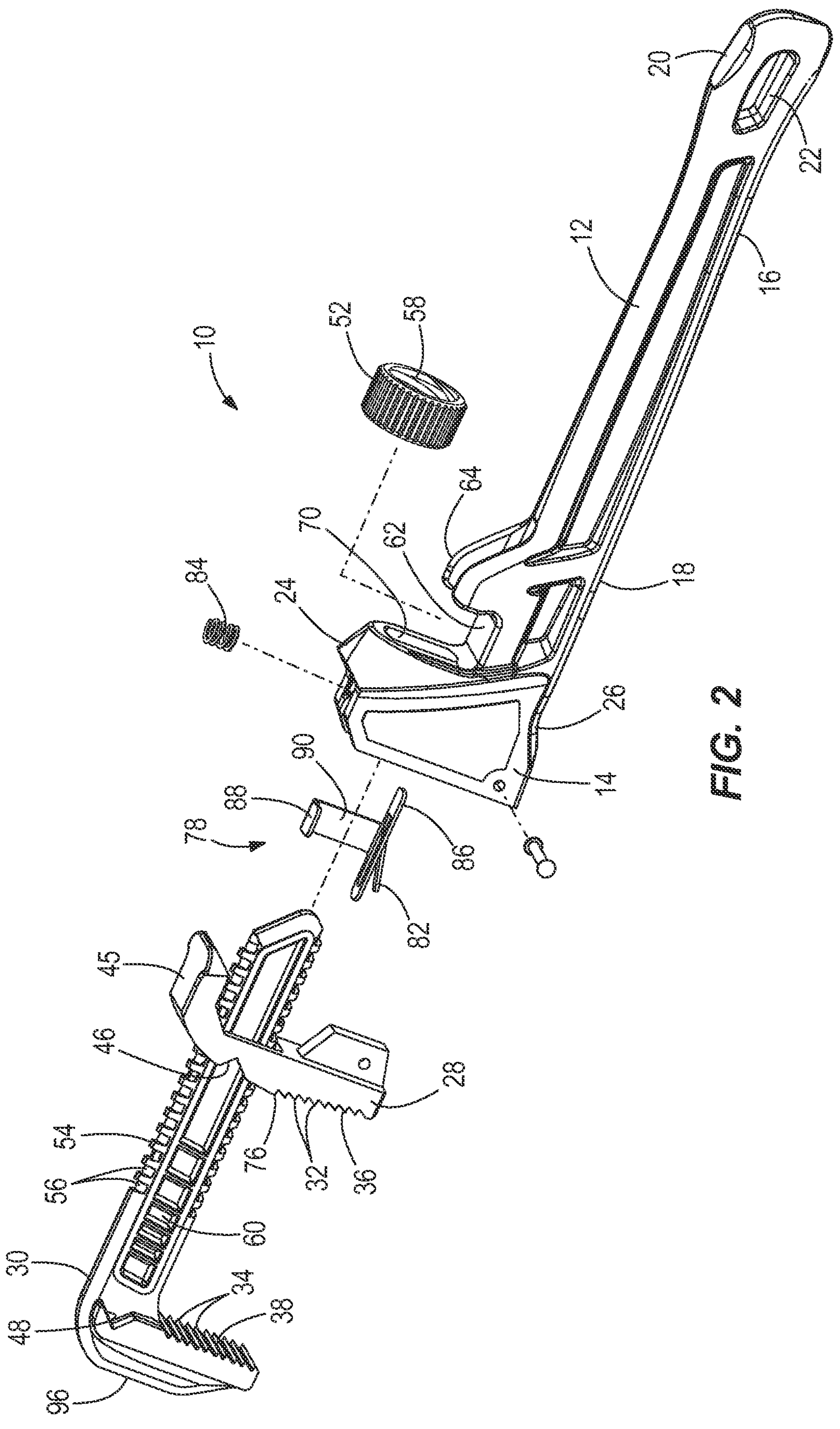
FIG. 2 is an exploded view of the wrench of FIG. 1.

With reference to FIGS. 1 and 2, the wrench 10 includes a first or fixed jaw 28, and a second or hook jaw 30. In the illustrated embodiment, the fixed jaw 28 is removably coupled to the head 14 so that the fixed jaw 28 can be replaced when it becomes worn. In other embodiments, the fixed jaw 28 can be permanently fixed to the head 14. The fixed jaw 28 and the hook jaw 30 each include a plurality of teeth 32, 34 that define contact regions 36 and 38, respectively. The hook jaw 30 is movable relative to the fixed jaw 28 generally in the directions of arrows 40 and 42, to increase or decrease a distance 44 between the jaws 28 and 30 (i.e., the perpendicular distance between the contact regions 36 and 38) in order to accommodate differently sized workpieces (e.g., pipes, fittings, etc.). The fixed jaw 28 and/or the hook jaw 30 can include a variety of shapes suitable to provide different gripping or wear characteristics, as may be desired. The fixed jaw 28 also includes a generally planar surface 45 usable as a hammering surface The wrench 10 further includes an auxiliary drive 50. The illustrated the auxiliary drive 50 is shaped as a square drive particularly suited to rotate a cleanout cover 51 (FIG. 18) of a pipe 53. The auxiliary drive 50 includes a first auxiliary drive portion 46 and a second auxiliary drive portion 48. In the illustrated embodiment the first auxiliary drive portion 46 is a notch that is generally V-shaped and the second auxiliary drive portion 48 is also a notch that is generally V-shaped. The notch 46 is spaced from the contact region 36 and cooperable with the notch 48 located on the hook jaw 30 to form the auxiliary drive 50. In operation, the notches 46, 48 receive opposite corners of a square projection 55 (FIG. 18) of the cover 51 and the wrench 10 is then used to rotate the cover 51 relative to the pipe 53 to install or remove the cover 51. In other embodiments, the auxiliary drive 50 can have other shapes.

The head 14 further includes an actuator 52 operable to vary the distance 44 between the jaws 28, 30. In the illustrated embodiment, the hook jaw 30 includes a threaded portion 54 having a plurality of grooves 56, and the actuator 52 is a thumb wheel 52 engaged with the threaded portion 54 of the hook jaw 30. The thumb wheel 52 includes internal threads 58 that mesh with the grooves 56 to move the hook jaw 30 in the direction of arrow 40 or 42 relative to the fixed jaw 28 in response to rotation of the thumb wheel 52. In the illustrated embodiment, the hook jaw 30 includes raised indicia 60 to indicate the relative distance 44 between the jaws 28, 30. The thumb wheel 52 is located within a recess 62 formed by the head 14 and a flange 64 projecting from the distal end portion 18 of the handle 12 to prevent the thumb wheel 52 from moving with the hook jaw 30 in the directions of arrows 40 and 42.

Figure 4:
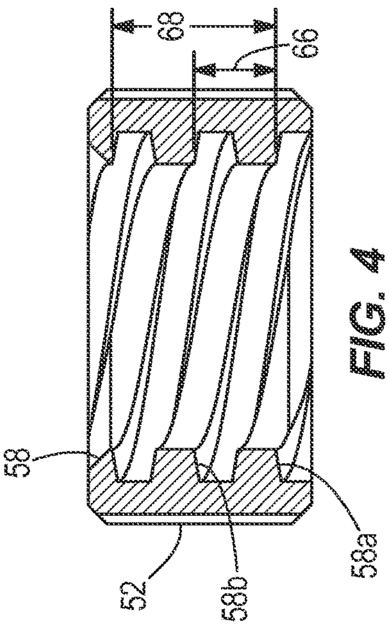
FIG. 4 is a cross-sectional view of a thumb wheel of the wrench of FIG. 1.

With reference to FIG. 4, the thumb wheel 52 is configured as a double-lead thumb wheel 52 (also referred to as a double-start or double-threaded thumb wheel). The threads

58 of the thumb wheel 52 define a pitch distance 66 (referred to hereafter as "pitch") and a lead distance 68 (referred to hereafter as "lead"). The pitch 66 is the axial distance between adjacent crests of the threads 58. The lead 68 is the linear distance that the hook jaw 30 is advanced (in the direction of arrow 40 or 42) for each complete rotation of the thumb wheel 52. A conventionally threaded thumb wheel (not shown) includes a single thread wrapped helically within the thumb wheel. The pitch 66 and the lead 68 of the conventional thumb wheel are equal; therefore the conventional thumb wheel would advance the hook gear 30 a linear distance equal to the pitch 66 for each complete rotation. In contrast, the illustrated thumb wheel 52 includes two separate threads 58*a* and 58*b*, offset 180 degrees and wrapped helically within the thumb wheel 52. As such, the hook jaw 30 advances twice the pitch 66 per rotation of the thumb wheel 52 (i.e., the lead 68 is twice the pitch 66), thereby requiring less rotation of the thumb wheel 52 to adjust the distance 44 between the jaws 28 and 30.

Figure 3B:
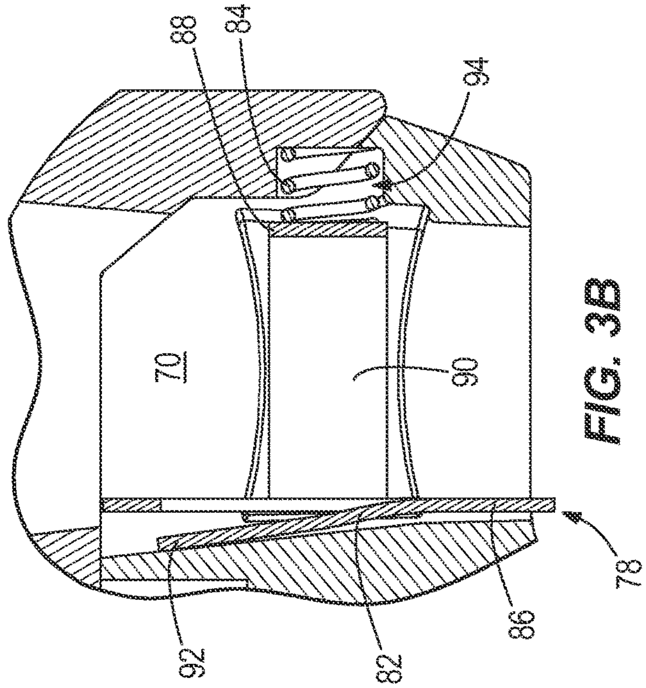
FIG. 3B is a detail view of a floating mechanism of the wrench of FIG. 1.
Figure 3A:
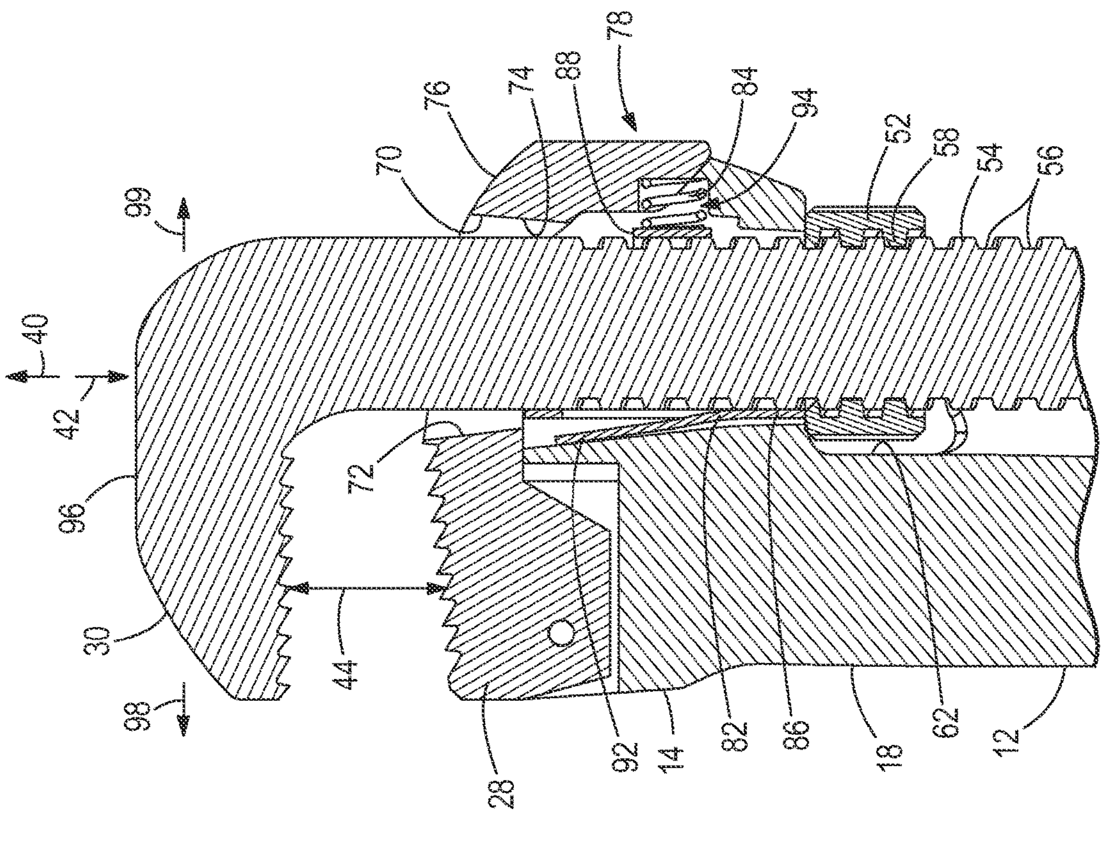
FIG. 3A is a partial cross-sectional view of the wrench of FIG. 1.
Figure 5:
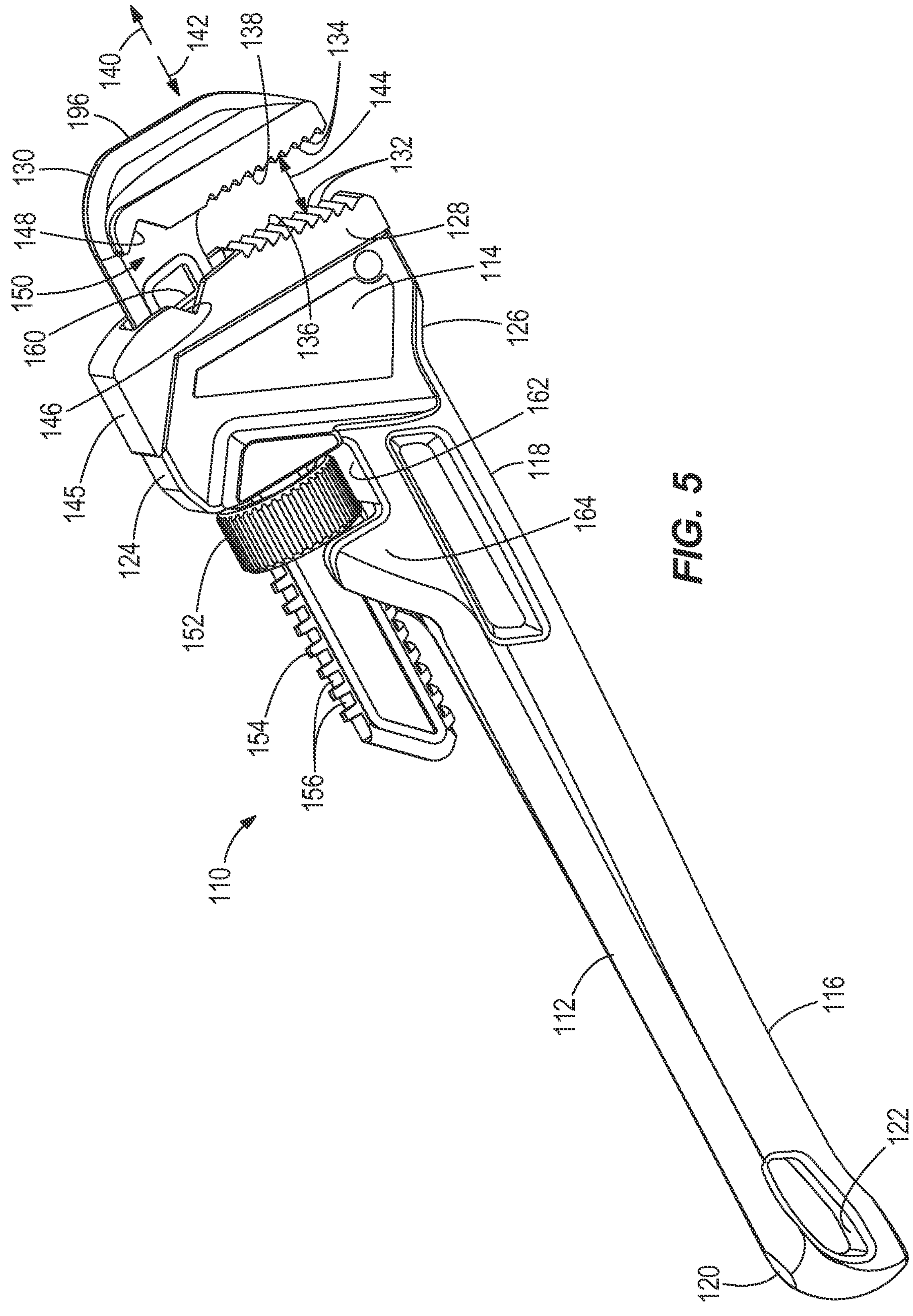
FIG. 5 is a perspective view of a wrench according to another embodiment of the invention.

With reference to FIGS. 3A and 3B, the threaded portion 54 of the hook jaw 30 is received in an aperture 70 that extends through the fixed jaw 28 and the head 14. The aperture 70 includes a front wall 72 and a back wall 74 that converge slightly toward each other, being farthest apart at a distal end 76 of the fixed jaw 28. The wrench 10 includes a floating mechanism 78 that centers the threaded portion 54 of the hook jaw 30 within the aperture 70 to define a floating position of the hook jaw 30 in which the hook jaw 30 is spaced slightly from the front wall 72 and the back wall 74 at the distal end 76 of the fixed jaw 28.

In the illustrated embodiment, the floating mechanism 78 includes a resilient projection 82, and a coil spring 84, and a pair of longitudinally extending guide walls 86 and 88 connected by a web 90 (FIG. 2). The guide walls 86 and 88 are slidably engageable with the threaded portion 54 of the hook jaw 30 to guide the hook jaw 30 within the aperture 70 (FIG. 3A). The resilient projection 82 extends from the guide wall 86 into a recess 92 located in the front wall 72, and the coil spring 84 is disposed within a recess 94 located in the back wall 74 (FIG. 3B). The resilient projection 82 and the coil spring 84 are deformable to allow a distal end 96 of the hook jaw 30 to move generally in the directions of arrows 98 and 99 of FIG. 3A, to an extent limited by engagement between the hook jaw 30 and the walls 72 and 74.

Figure 18:
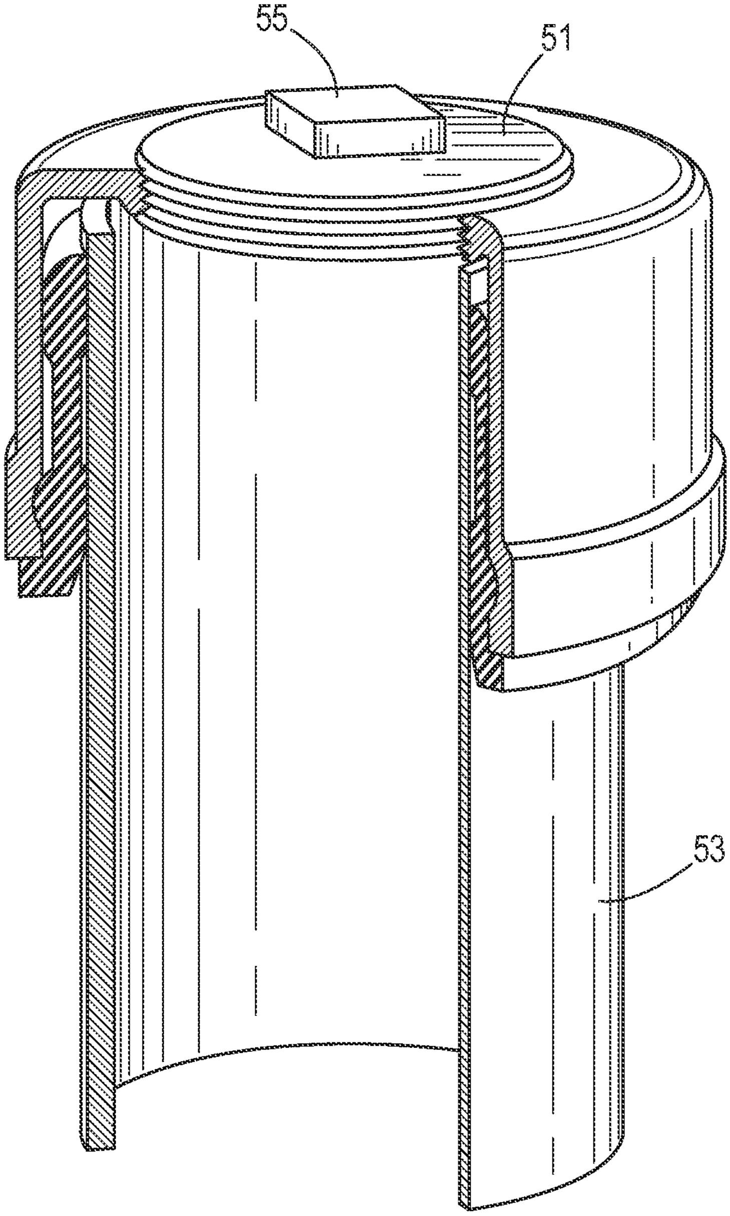
FIG. 18 PRIOR ART
FIG. 18 is a partial cross-sectional view of prior art pipe and cleanout cover.

In operation, the user can use the wrench 10 to turn a workpiece, such as a pipe or fitting (not shown). To position the wrench 10 about the workpiece, the user rotates the thumb wheel 52 to adjust the distance 44 between the jaws 28 and 30. As the user rotates the thumb wheel 52, the meshing between the threads 58 of the thumb wheel 52 and the threaded portion 54 of the hook jaw 30 causes the hook jaw 30 to move in the direction of either arrow 40 or 42, depending on which direction the thumb wheel 52 is rotated. With the distance 44 between the jaws 28, 30 slightly larger than the outer diameter of the workpiece, the jaws 28 and 30 easily fit onto the workpiece because the jaws 28 and 30 do not bind on the workpiece. Then, the user further rotates the thumb wheel 52 to reduce the distance 44 between the jaws 28 and 30 until the contact regions 36 and 38 of the jaws 28 and 30 contact the workpiece. As discussed above, the auxiliary drive 50 can be used to rotate the cover 51 (FIG. 18). The user can rotate the thumb wheel 52, as described above, to adjust the distance between the notches 46, 48 so that the auxiliary drive 50 can be used with projections 55 (FIG. 18) having different dimensions.

With reference to FIG. 3A, the floating mechanism 78 holds the hook jaw 30 in a central position between the walls 72 and 74, but permits the distal end 96 of the hook jaw 30 to be moved in the direction of arrow 98 or 99. The hook jaw 30 may thus be accurately positioned to engage the workpiece, and when the handle 12 is rotated (clockwise, in the illustrated orientation) the hook jaw 30 tilts within the aperture 70 in the direction of arrow 98 to close on the workpiece. When the pressure is released and the handle 12 rotated counter-clockwise, the hook jaw 30 is returned by the floating mechanism 78 to its centered position in the direction of arrow 99, allowing the jaws 28 and 30 to be repositioned on the workpiece.

FIGS. 5-7B illustrate a wrench 110 according to another embodiment of the invention. The wrench 110 is similar to the wrench 10; therefore, like components have been given like reference numbers plus 100 and only differences between the wrenches 10 and 110 will be discussed in detail. In addition, components or features described with respect to only one or some of the embodiments described herein are equally applicable to any other embodiments described herein.

Figure 6:
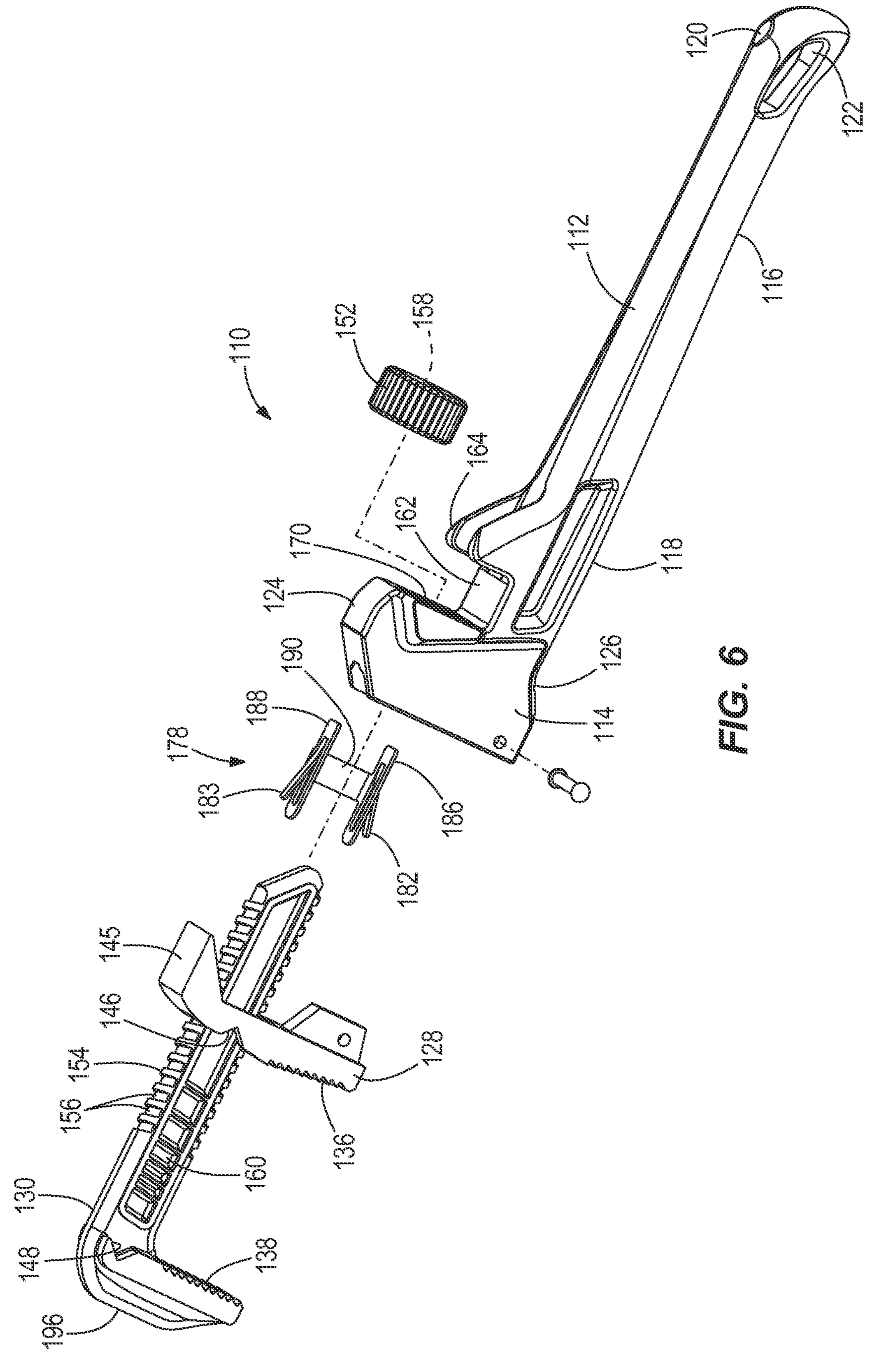
FIG. 6 is an exploded view of the wrench of FIG. 5.
Figure 7A:
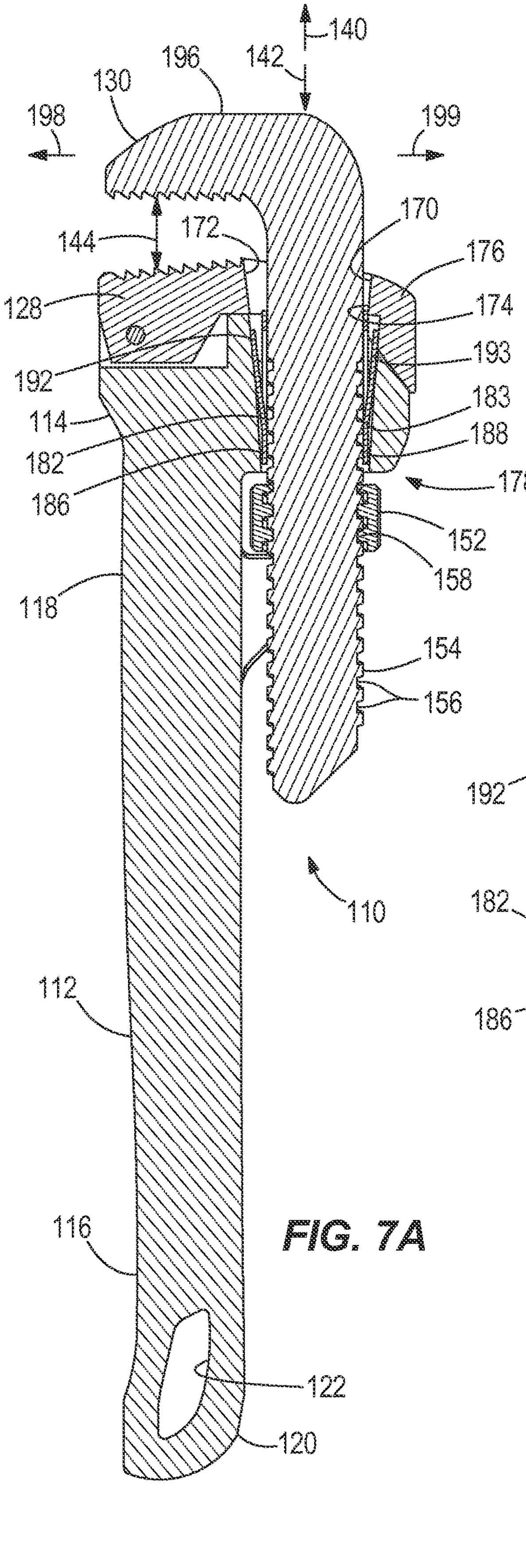
FIG. 7A is a cross-sectional view of the wrench of FIG. 5.
Figure 7B:
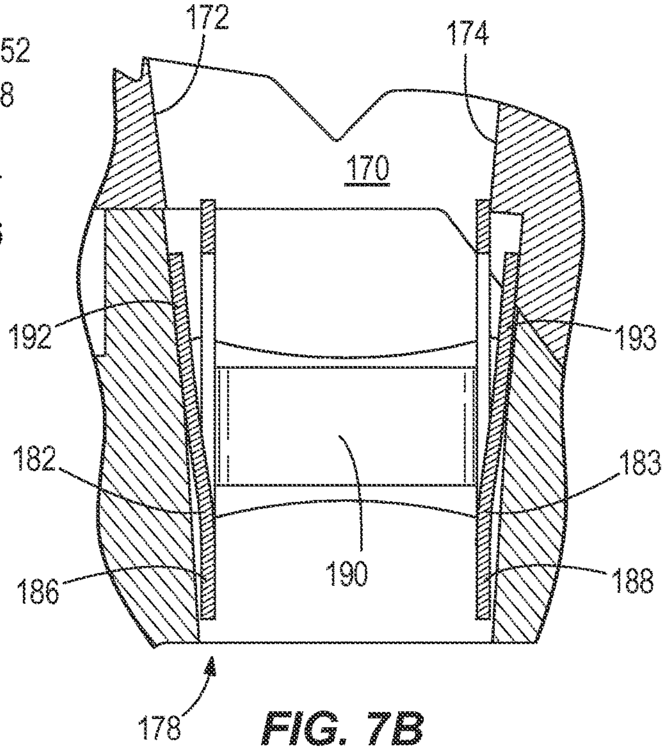
FIG. 7B is a detail view of a floating mechanism of the wrench of FIG. 5.

With reference to FIGS. 6-7B, the floating mechanism 178 includes a resilient projection 183 in place of the coil spring 84 of the wrench 10. As such, the floating mechanism 178 can be formed as a single piece by a suitable process (e.g., stamping). The resilient projection 183 extends from the guide wall 188 and into a recess 193 located in the back wall 174 (FIG. 7B). The resilient projections 182 and 183 are deformable to allow the distal end 196 of the hook jaw 130 to move relative to the fixed jaw 28 generally in the direction of arrows 198 or 199 of FIG. 7A.

Figure 8:
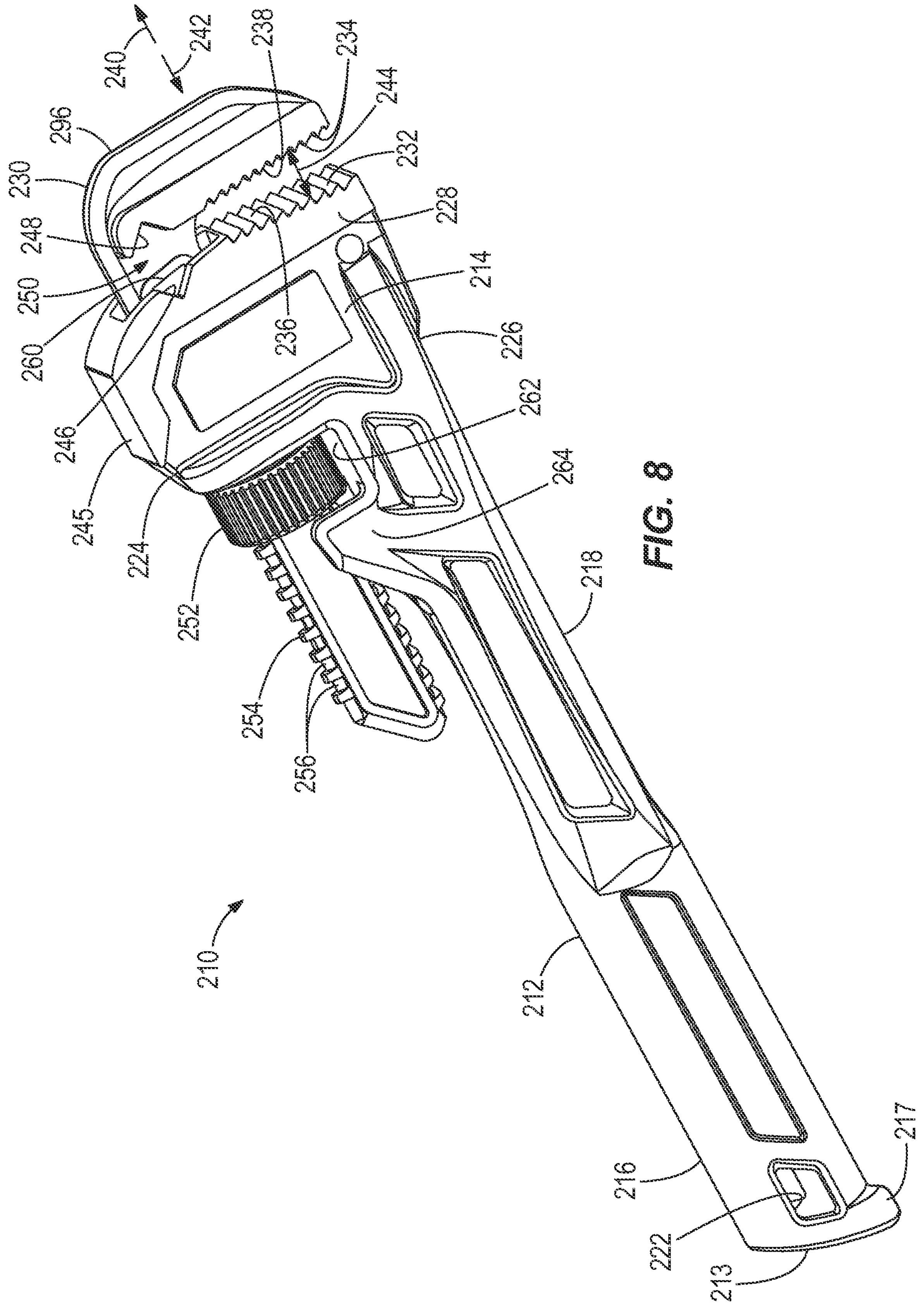
FIG. 8 is a perspective view of a wrench according to another embodiment of the invention.
Figure 9:
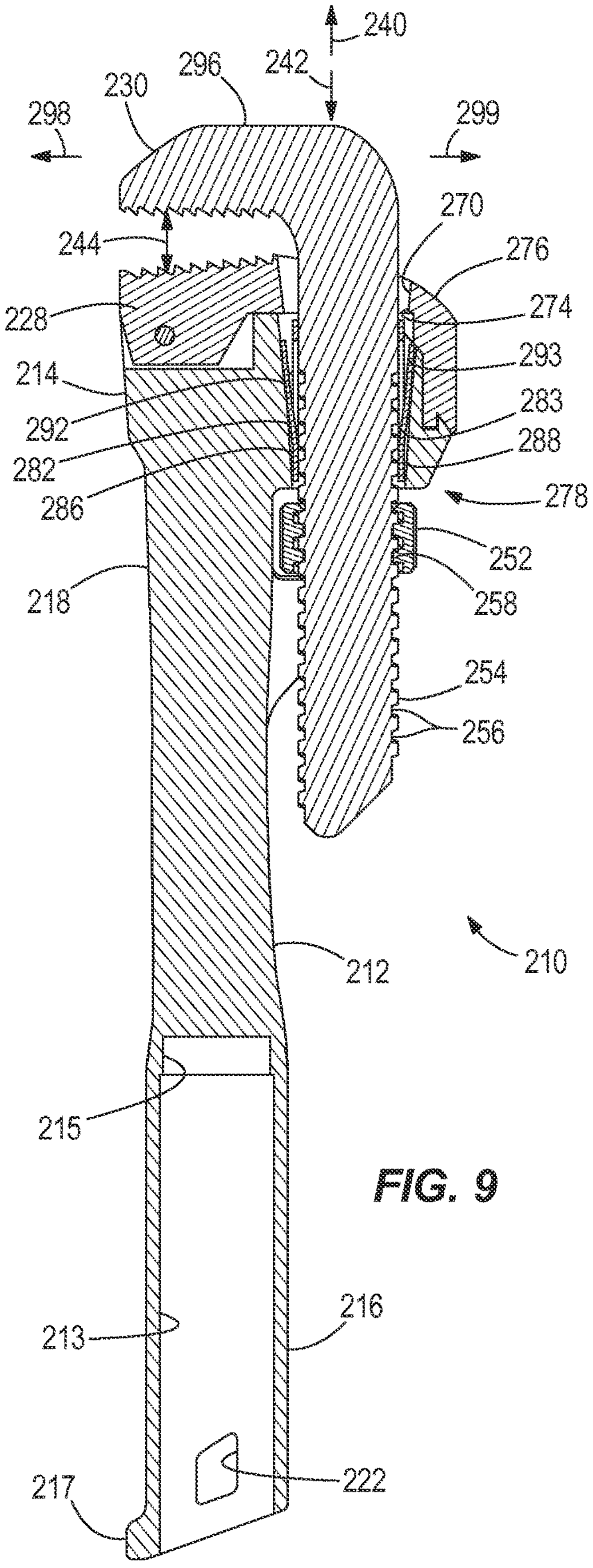
FIG. 9 is a cross-sectional view of the wrench of FIG. 8.

FIGS. 8 and 9 illustrate a wrench 210 according to yet another embodiment of the invention. The wrench 210 is similar to the wrench 110; therefore, like components have been given like reference numbers plus 100 and only differences between the wrenches 110 and 210 will be discussed in detail. In addition, components or features described with respect to only one or some of the embodiments described herein are equally applicable to any other embodiments described herein.

The handle 212 includes a bore 213 extending through the proximal end portion 216 of the handle 212. The bore 213 is configured to accommodate an extension piece or extension handle to extend the handle 212 and provide greater reach for the wrench 210, facilitating use of the wrench 210 in tight, overhead spaces. In the illustrated embodiment, the bore 213 is configured to accommodate a piece of ¾" diameter pipe, and includes a step 215 to better accommodate a piece of pipe having a threaded end. For example, the handle 312 of FIG. 10 (discussed in more detail below), which includes a threaded end portion 319, can be threaded into the bore 213 of handle 212 to extend the length of the handle 212. Of course, in other embodiments, the bore 213 can be configured to accommodate any type or size extension piece. The handle 212 also includes a projection 217 located on the proximal end portion 216. The projection 217 provides some security to inhibit the handle 212 from slipping out from a user's grasp.

FIGS. 10-13 illustrate a wrench 310 according to yet another embodiment of the invention. The wrench 310 is similar to the wrench 210; therefore, like components have been given like reference numbers plus 100 and only differences between the wrenches 210 and 310 will be discussed in detail. In addition, components or features described with respect to only one or some of the embodiments described herein are equally applicable to any other embodiments described herein.

Figure 10:
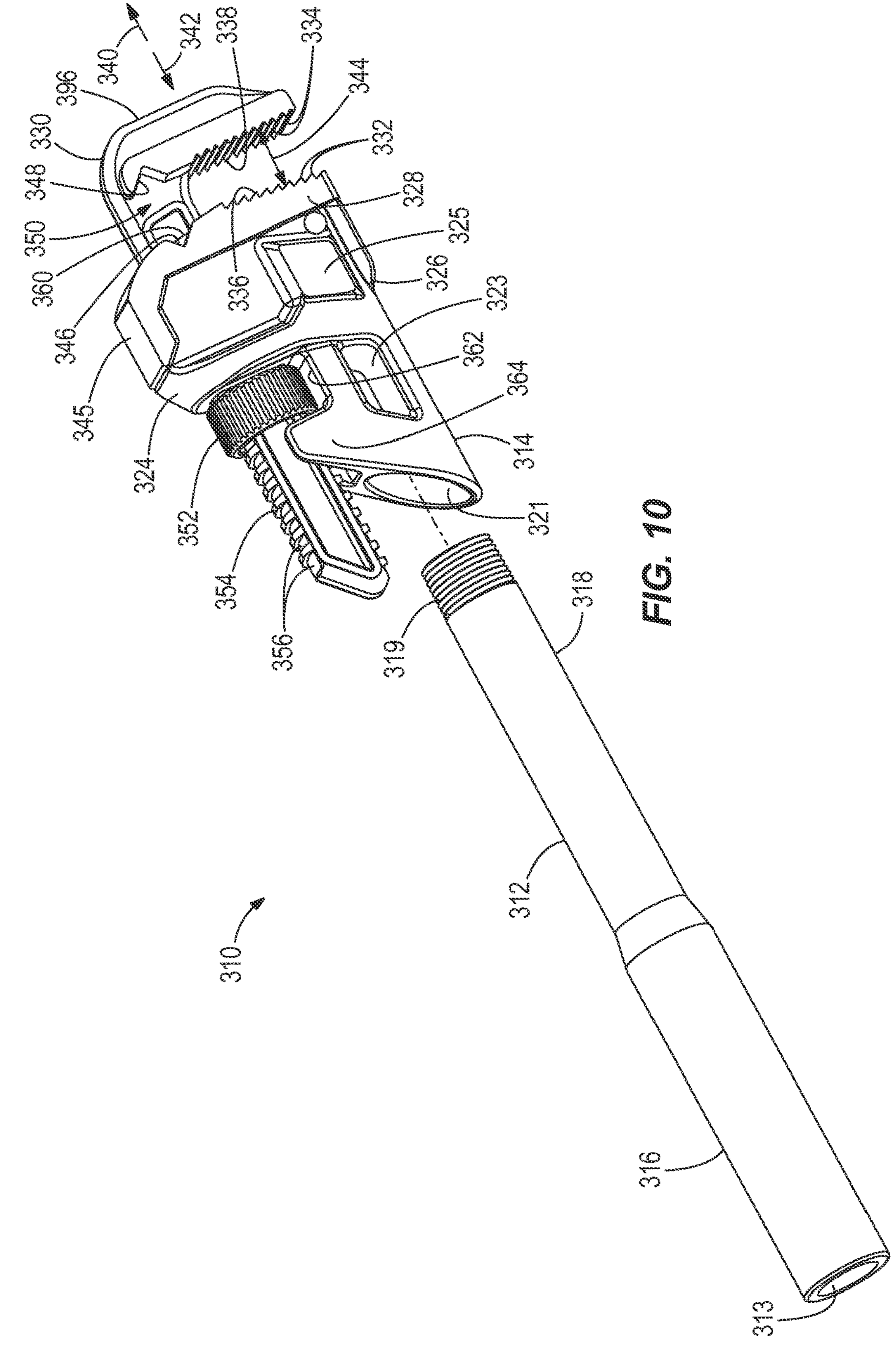
FIG. 10 is a partially-exploded view of a wrench according to another embodiment of the invention.
Figure 11:
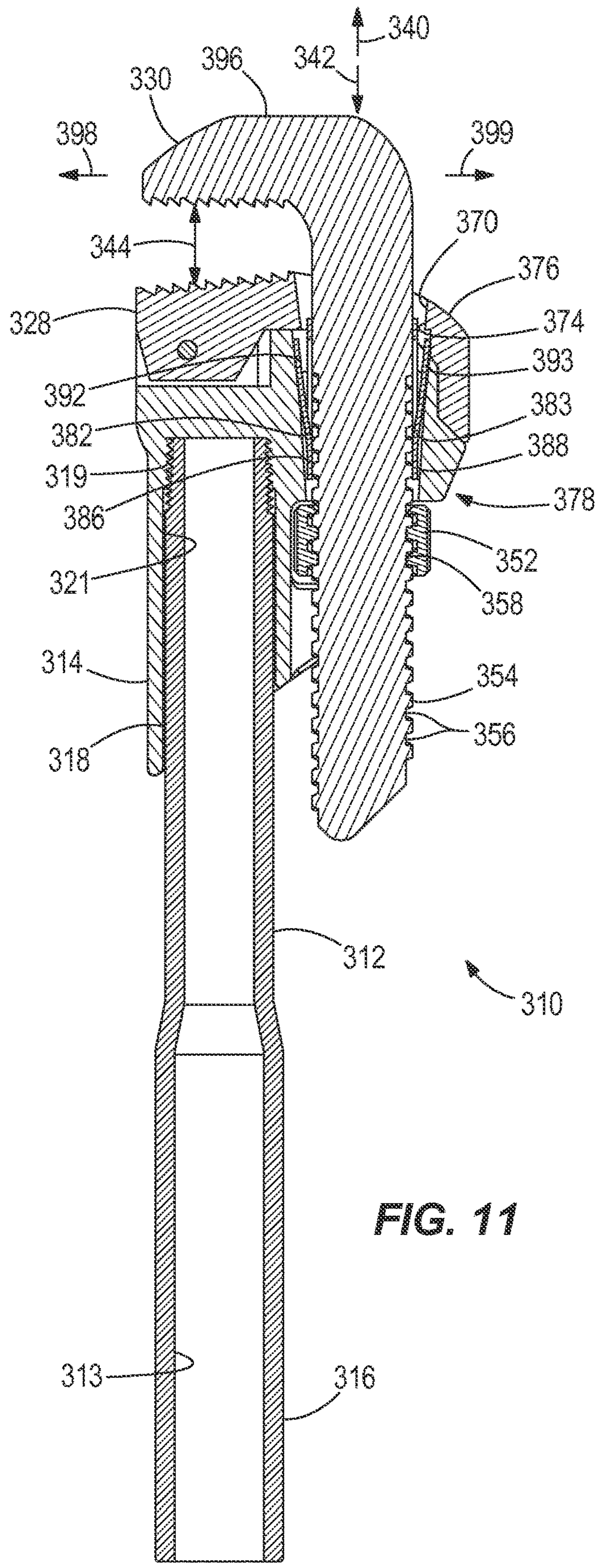
FIG. 11 is a cross-sectional view of the wrench of FIG. 10.

With reference to FIG. 10, the handle 312 of the wrench 310 includes a threaded portion 319 threadably engageable with a bore 321 to removably couple the handle 312 to the head 314. The head 314 includes an aperture 323 that extends transversely through the bore 321 to allow the user to visually determine if the handle 312 is completely threaded into the bore 321. In the illustrated embodiment, the handle 312 has a length of about 14 inches. In other embodiments, the handle 312 can have a length of about 18 inches to provide additional reach and to facilitate use of the wrench 310 in overhead spaces. The handle 312 can be provided in various other lengths to suit a variety of applications of the wrench 310. The handle 312 is hollow, reducing the weight of the handle 312 and allowing the handle 312 to accommodate an extension piece to extend the handle 312 and provide greater reach for the wrench 310 (FIG. 11). In some embodiments, the handle 312 can include a removable plug (not shown) to seal the proximal end portion 316 of the handle 312 (e.g., to provide storage within the hollow handle 312). The head 314 also includes a generally flat surface 325 suitable for use as a hammering surface.

Figure 12:
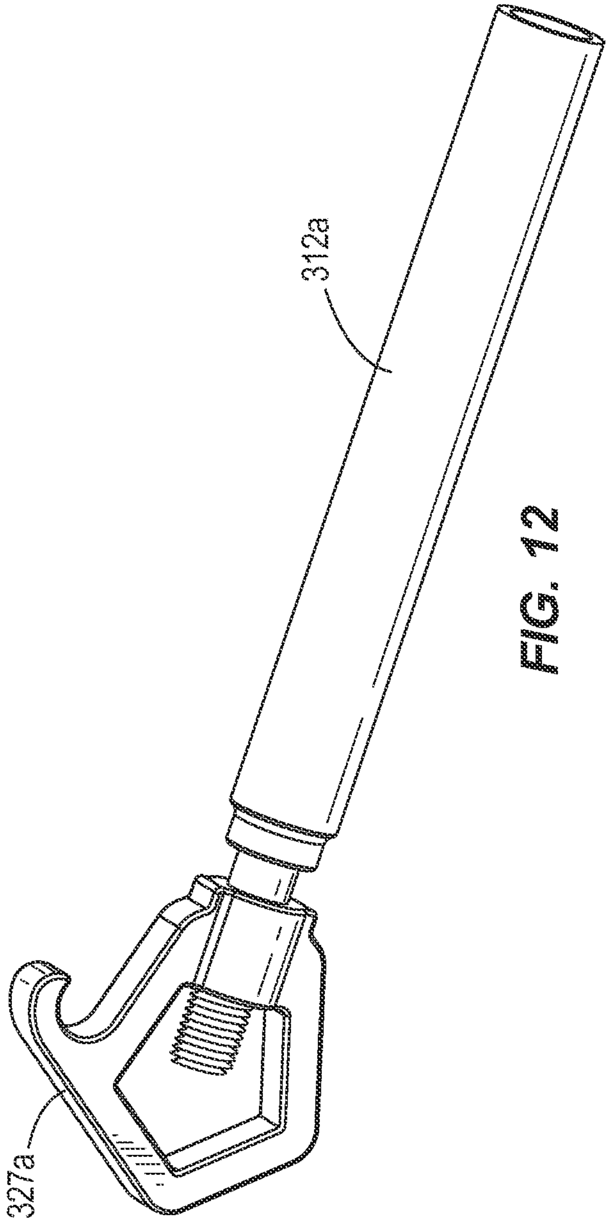
FIG. 12 is a perspective view of a handle for use with the wrench of FIG. 10.
Figure 13:
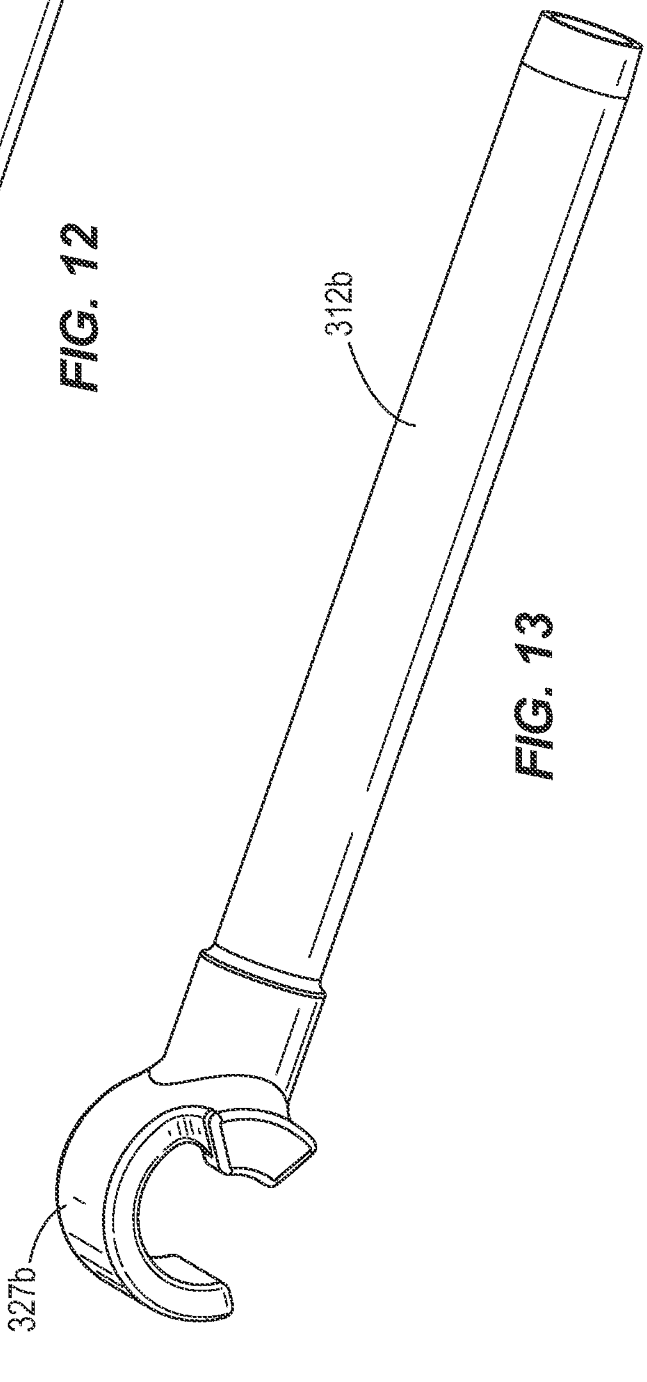
FIG. 13 is a perspective view of another handle for use with the wrench of FIG. 10.

FIGS. 12 and 13 illustrate additional handles 312*a* and 312*b* that can be removably coupled to the head 314 to provide additional functionality to the wrench 310. The handle 312*a* is configured as a fire hydrant handle and includes an end 327*a* shaped to facilitate operation of standard fire hydrant valves. The handle 312*b* is configured as a valve wheel handle and includes an end 327*b* shaped to facilitate rotation of conventional valve wheels (not shown). Other types of handles (not shown) can also be provided.

Figure 14A:
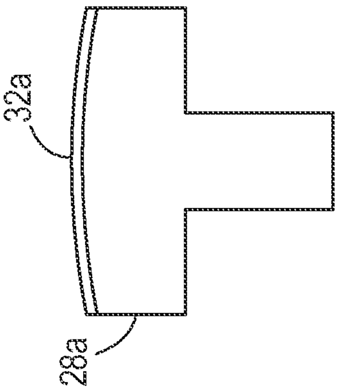
FIG. 14A is a plan view of a jaw for use with the wrench of FIG. 1.
Figure 14B:
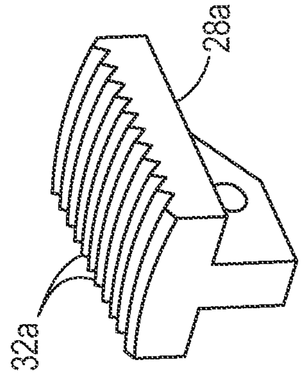
FIG. 14B is a perspective view of the jaw of FIG. 14A.
Figure 15A:
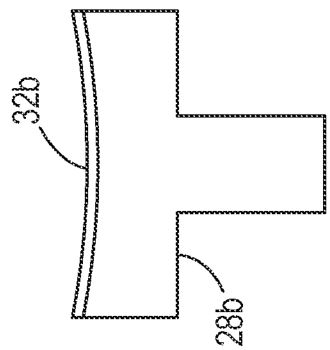
FIG. 15A is a plan view of another jaw for use with the wrench of FIG. 1.
Figure 15B:
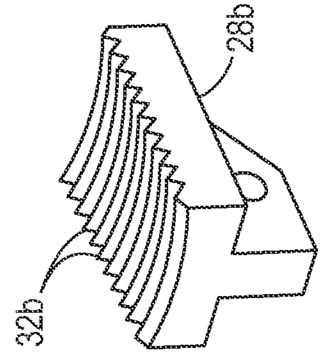
FIG. 15B is a perspective view of the jaw of FIG. 15A.
Figure 16A:
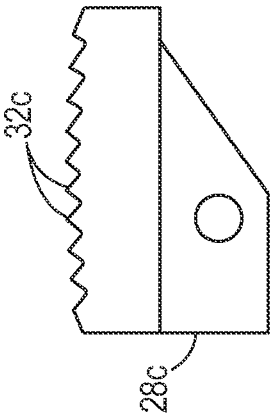
FIG. 16A is a plan view of another jaw for use with the wrench of FIG. 1.
Figure 16B:
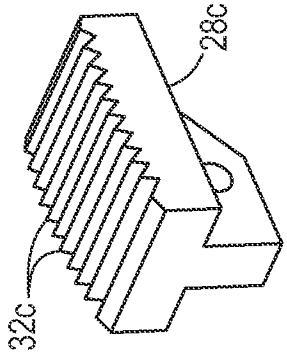
FIG. 16B is a perspective view of the jaw of FIG. 16A.
Figure 17A:
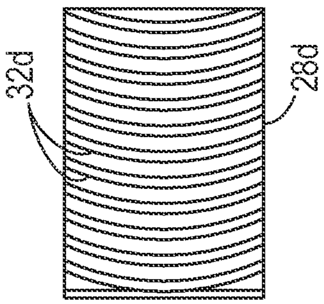
FIG. 17A is a plan view of another jaw for use with the wrench of FIG. 1.
Figure 17B:
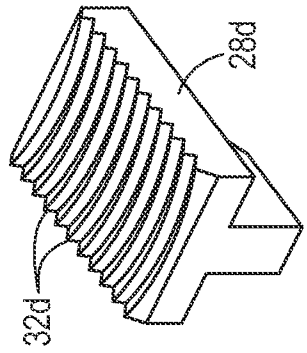
FIG. 17B is a perspective view of the jaw of FIG. 17A.

FIGS. 14A-16B illustrate a variety of fixed jaws 28*a*, 28*b*, 28*c*, and 28*d* usable with any of the wrenches 10, 110, 210, and 310 described above. With reference to FIGS. 14A and 14B, the jaw 28*a* includes teeth 32*a* having a generally convex, arc-shaped profile. With reference to FIGS. 15A and 15B, the jaw 28*b* includes teeth 32*b* having a generally concave, arc-shaped profile. With reference to FIGS. 16A and 16B, the jaw 28*c* includes teeth 32*c* arranged in an arc shape along a longitudinal direction of the jaw 28*c*. With reference to FIGS. 17A and 17B, the jaw 28*d* includes curved teeth 32*d*. The jaws 28*a*, 28*b*, 28*c*, and 28*d* can be interchangeable to provide different gripping and wear characteristics, as may be desired.

Although the invention has been described in detail with reference to certain preferred embodiments, variations and modifications exist within the scope and spirit of one or more independent aspects of the invention as described.

What is claimed is:

1. A pipe wrench including:

a head including an aperture, the aperture being defined by a front wall, a back wall and side walls extending between the front and back walls;

a first jaw that is coupled to the head, the first jaw including a plurality of teeth that define a contact a region;

a second jaw that extends through the aperture of the head, the second jaw including a threaded portion and a plurality of teeth that define a contact region;

an auxiliary drive comprising:

- a first auxiliary drive portion recessed into an upper edge of at least one of the sidewalls defining the aperture, the first auxiliary drive portion spaced from the contact region of the first jaw; and a second auxiliary drive portion positioned on the second jaw spaced from the contact region of the second jaw;

a floating mechanism disposed in the aperture, the floating mechanism supporting the second jaw in a central position within the aperture, the floating mechanism comprising:

a first resilient portion that extends longitudinally along an inner surface of the front wall that defines the aperture;

a second resilient portion that extends longitudinally along an inner surface of the back wall that defines the aperture; and a web connecting the first resilient portion to the second resilient portion, the web includes a top edge and a bottom edge, wherein the web is uninterrupted and extends continuously between the top edge and bottom edge, and wherein the web extends in a perpendicular orientation relative to the first and second resilient portions;

a thumb wheel that includes threads engaged with the threaded portion of the second jaw such that rotation of the thumb wheel relative to the head moves the contact region of the second jaw toward or away from the contact region of the first jaw;

a primary handle integrally formed with the head as a single component, the primary handle including a proximal end portion and a distal end portion, the distal end portion adjacent the head and the proximal end portion opposite the distal end portion, the primary handle also including a bore extending through the proximal end portion, the bore including a first end, a second end, a step portion positioned closer to the first end than the second end, and a non-threaded portion positioned closer to the second end than the first end, and an opening positioned at the second end; and an extension handle at least partially received in the bore through the opening and the non-threaded portion before a threaded end portion of the extension handle engages the step portion, the extension handle removably coupled to the primary handle;

wherein the primary handle includes a second aperture, the second aperture extends transversely through a sidewall of the primary handle into the bore at the proximal end portion.

2. The pipe wrench of claim 1, wherein the extension handle includes a ¾ inch diameter pipe.

3. The pipe wrench of claim 1, wherein the extension handle is hollow.

4. The pipe wrench of claim 3, wherein the extension handle is hollow along an entire length of the extension handle.

5. The pipe wrench of claim 1, wherein the step portion is integrally formed with the primary handle.

6. The pipe wrench of claim 1, wherein the thumb wheel includes a pair of two separate threads offset from each other by 180° and wrapped helically within the thumb wheel.

7. The pipe wrench of claim 1, wherein the web includes a first edge extending between the top edge and the bottom edge and connected to the first resilient portion and a second edge extending between the top edge and the bottom edge and connected to the second resilient portion and wherein the web is uninterrupted and extends continuously between the first edge and the second edge.

8. The pipe wrench of claim 1, wherein the bottom edge of the web extends generally parallel to the major axis of the web and wherein the first and second resilient portions extend beyond the bottom edge and the top edge of the web.

9. The pipe wrench of claim 1, wherein the aperture further includes a first end adjacent to the first jaw, a second end opposing the first end and a recess positioned along a portion of the back wall, the recess extending from below the first end downward to the second end and wherein the second resilient portion extends into the recess.

10. The pipe wrench of claim 7, wherein the top edge extends a first length and the first edge extends a second length and wherein the first length is greater than the second length.

11. The pipe wrench of claim 1, wherein the primary handle further comprises a projection positioned at the proximal end portion, the projection extending radially outward from the primary handle.

12. The pipe wrench of claim 11, wherein the projection extends outward from a front side surface of the primary handle, and wherein, when a user grasps the primary handle with a hand, the projection inhibits movement of the hand of the user relative to the primary handle.

13. The pipe wrench of claim 1, wherein the first auxiliary drive portion is a first notch, and wherein the second auxiliary drive portion is a second notch facing the first notch.

14. The pipe wrench of claim 13, wherein the first auxiliary drive portion and the second auxiliary drive portion each have a V shape.

15. The pipe wrench of claim 1, wherein the auxiliary drive that is formed by the first auxiliary drive portion together with the second auxiliary drive portion has a square shape.

16. The pipe wrench of claim 1, wherein the head further comprises a generally planar rear surface, wherein the generally planar rear surface is positioned between the contact surface of the second jaw and the threaded portion.

17. The pipe wrench of claim 16, wherein the head further comprises a chamfered region, and wherein the chamfered region is positioned along the longitudinal axis between the generally planar rear surface and the thumb wheel.

* * * * *